Dec. 12, 1950         C. W. SCHOTT         2,533,633
GRANULATED SLAG AND METHOD FOR PRODUCING IT
Filed April 1, 1946         2 Sheets-Sheet 1
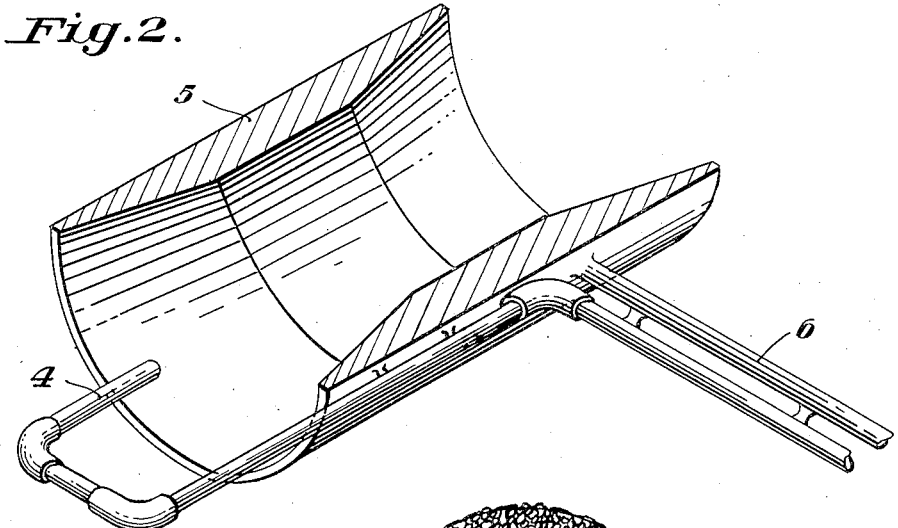
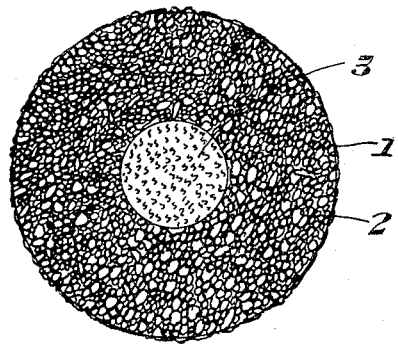
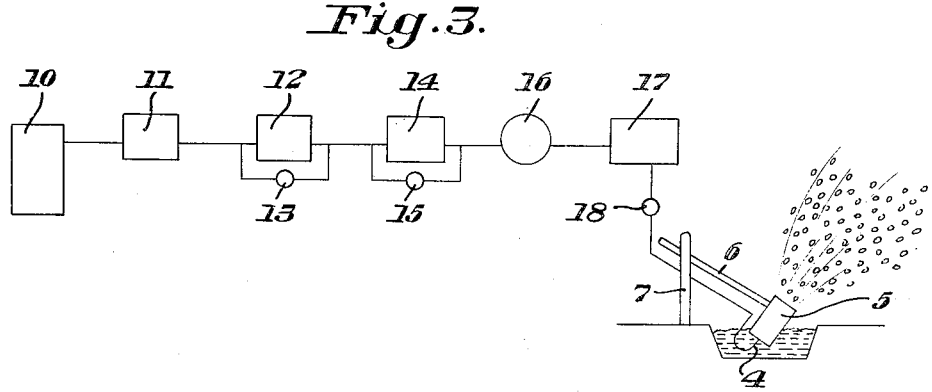
INVENTOR.
Charles W. Schott
BY
Stebbins, Blenko & Webb
his attorneys Dec. 12, 1950 — C. W. SCHOTT — 2,533,633
GRANULATED SLAG AND METHOD FOR PRODUCING IT
Filed April 1, 1946 — 2 Sheets-Sheet 2

INVENTOR.
Charles W. Schott
BY
Stebbins, Blenko & Webb
his attorneys

Patented Dec. 12, 1950

2,533,633

UNITED STATES PATENT OFFICE 2,533,633

GRANULATED SLAG AND METHOD FOR PRODUCING IT

Charles W. Schott, Duquesne, Pa.

Application April 1, 1946, Serial No. 658,726

7 Claims. (Cl. 49—77.5)

The present invention relates to the granulation of blast-furnace slag and like material and particularly to a novel process for the treatment of slag and the novel product thereof which has peculiarly desirable properties.

The granulation of molten blast-furnace slag and like material by a jet of steam or other gas under pressure has long been known. Various forms of apparatus have been used for this purpose, with but slight variety in product which is usually in the form of brittle, dense pellets. The granulation of slag is of great importance in that by it, a product having slight value can be converted to one of considerable value. Granulated slag in one form or another is useful in the manufacture of building blocks, certain types of cement products, road building material and insulating slabs, blocks and pellets. The usual methods of slag granulation produce a product which is coarse, fragile and absorbent. Moreover, the control of quality and size of product has been difficult so that it lacks uniformity.

The object of this invention is to produce a granulated product of slag or like material in the form of individual particles of cellular structure which are more or less vitreous upon the outer surface and thereby not subject to moisture penetration, and which are likewise free from cracking, breaking, and crumbling during formation. The control of weight and quality of the granulated product is also an object of this invention. These desirable characteristics are imparted by a novel method for introducing fluid into the molten slag and by the control of temperature, pressure and moisture content of the fluid at the time of introduction. By appropriately determining these conditions, I am able to control the size and weight of the product formed and promote the formation of a vitreous outer surface. I also cool the pellets in a wet steam atmosphere. This reduces the percentage of cracked, broken or powdered pieces in the product, being somewhat in the nature of an annealing process.

In a preferred practice of my invention the process consists in the introduction of a fluid such as steam, air or the like, of controlled pressure, temperature and moisture content, into a pool of molten slag by means of a special blower if it is desired to make bubbles or pellets. The fluid is injected into a charge of molten slag in an expansion chamber if blocks, slabs or columns are to be made. In making bubbles or pellets, fluid under pressure is introduced under the surface of the molten slag. In this operation the entire system is under pressure. Being under pressure, the gas is forced into solution in the slag to a certain extent and also, thoroughly mixed mechanically. Globules of molten slag are blown from the main body of the slag. Each globule contains a definite amount of gas both mechanically trapped and in solution, and because of the surface tension of the molten slag the gas is retained. Because of the heat imparted to the gas and the release of external pressure the gas tends to expand. The gas continues to expand until the freezing point of the slag is reached. Once the slag freezes or solidifies, the reaction within the individual pellet reaches equilibrium i. e., the heat of the slag is expended in expanding the gas until solidification takes place. The tremendous power released by fluid expansion within the confining walls of the blower causes the particles to be ejected from the blower with considerable force. These molten particles immediately become spherical in shape, in the normal manner of liquid drops and thereupon start to cool and solidify. The particles are permitted to fall into an atmosphere of wet steam, serving somewhat the purpose of an anneal, where they are completely cooled, thus preventing cracking and breaking.

A complete understanding of my invention may be had by referring to the accompanying drawings, illustrating a preferred embodiment and practice. In the drawings, Figure 1 is a sectional view through a bubble or a pellet of granular slag produced by my method and apparatus;

Figure 2 is a sectional view through the blower nozzle;

Figure 3 is a schematic diagram of the means used to control the fluid flow and produce the pellets;

Figure 5:
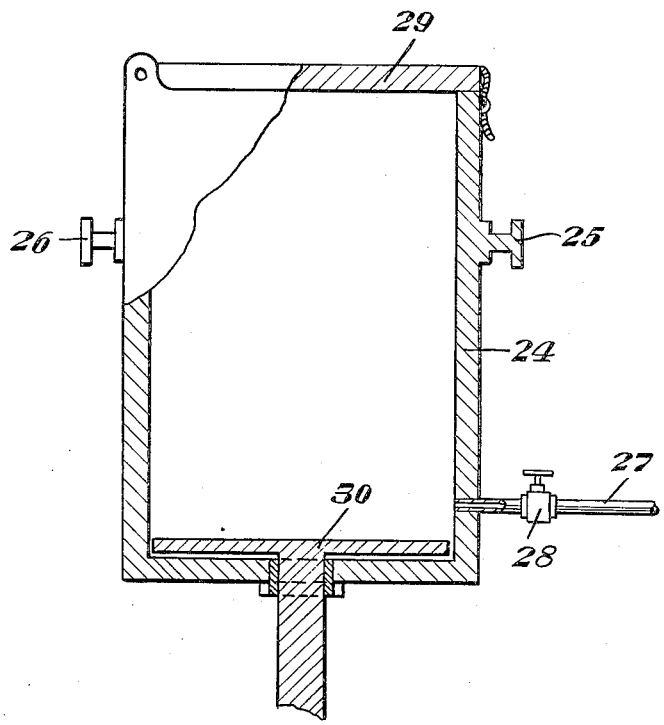
Figure 5 is a sectional view through the expansion chamber for the production of slags or blocks.

A particle of my novel granulated slag product, as shown in Figure 1, has the form of a bubble or sphere consisting of a vitreous spherical shell 1 of solidified slag enclosing a cellular sphere 2 having a central void 3. The particle varies in diameter from 1/64" or less to 3/4". The product is formed by introducing a fluid of controlled temperature, pressure and moisture content into a pool of molten slag. The product weighs from 5 to 60 pounds per cubic foot, depending on the moisture content of the fluid, and varying inversely therewith.

Conversion of molten slag into particles or bubbles is accomplished by the use of a special blower shown in Figure 2. It comprises a Venturi tube 5 partly immersed in a pool of molten slag as shown in Figure 3. A nozzle 4 discharges a jet of fluid centrally of the tube. The tube is mounted on a supporting arm 6 secured to any suitable fixed means such as post 7. The jet from the nozzle blows droplets of slag through tube 5 and they expand as they travel therefrom. The pressure of the steam or air is used to aid in propelling the particles of slag from the pool. The fluid also acts as a carrying agent for minute particles of water (fog) which generate explosive pressure due to expansion at the moment they emerge from the nozzle located below the surface of the slag. Since the action at the nozzle is violent and is actually blanketed by the pressure above the nozzle, the minute particles of water are thoroughly mixed with the slag under pressure, a certain amount of water is taken into solution by the slag.

To aid in the rapid cooling of the pellets and yet provide a gentle quench, an atmosphere of wet steam is maintained on the exhaust side of the blower. This can be accomplished by releasing steam from a series of nozzles below the level of the blower and in an enclosure into which the pellets fly.

In the system schematically illustrated in Figure 3, 10 is a source of fluid such as a steam boiler, 11 is a means for pressure control such as a pressure regulator, 12 and 13 are means for injecting a controlled amount of moisture, 14 and 15 are means for controlled heating of the fluid, 16 is a calorimeter, 17 is a means for final pressure control, and 18 is a pressure gauge. By these means, I produce a steam jet from nozzle 4 containing from ½% to 15% moisture (i. e., wet steam). The steam should be under a pressure of from 15 to 110 lbs. per square inch. The slag should be at a temperature of from 2500° F. to 2900° F. The moisture in the steam is thus immediately vaporized on striking the slag and blows forth innumerable droplets from the slag pool which expand as they fly through the air for a distance from 30′ to 50′.

At the moment of contact, the slag is at a temperature of between 2500° and 2900° F. and the water may be at a temperature of from 212° to 300° F. At this temperature, the water is in such a finely divided state that it can be called saturated vapor. It is desirable to have the water and its carrying medium (steam or air) at an elevated temperature (212 to 500° F.) so as to permit a more positive means of control in the actual mixing of slag and moisture.

By way of further explanation it may be noted that as the gas enters the blower, it disintegrates the liquid slag or actually causes the formation of small globules of liquid slag. Each globule of slag is under explosive force and is charged with gas. This gas is trapped mechanically because of the intimate mixture of gas and slag and is held by the surface tension of the liquid slag. An additional quantity of gas is held in solution because of the pressure in the blower.

It will be remembered that blast furnace slag contains considerable gas in solution as it emerges from the furnace. This gas is not under more than the normal operating pressure of the furnace (usually around 20#/sq. inch or less). In my process the molten slag remains at approximately the same temperatures as exists in the hearth of the furnace therefore the solubility of the water vapor due to temperature will be equal to that within the furnace. Since the gas absorbs heat from the slag it follows that as soon as the forming bubble leaves the blower it solidifies and retains the voids formed by the expanding gas (mixed) and escaping soluble gas.

In the continuous process described after the water vapor has entered the slag (mixed and in solution), the pressure of the entering fluid (from nozzle) combined with the explosive force of the slag and water mixing, forces the small pellets of slag out of the main body of slag and into the air. As soon as the pellets begin their upward flight the water vapor in solution in the slag forms the tiny cells about the circumference or wall of the pellet while the entrapped air or stream forms a large void at the center of the pellet. Once out of the pressure area of the blower, the pellet expands and almost immediately solidifies into a rounded shape comprising a relatively large void surrounded by an infinite number of smaller voids or cells.

The moisture content of the fluid necessary to produce this new porous slag product ranges from ½% to 15%. The weight of the product varies inversely with the moisture content of the fluid. Experimental data show that the added moisture in the fluid causes a greater expansion upon mixing with the slag at the moment of contact. This occurs as soon as the pellets of the slag leave the main body or pool of slag. The heat of the slag causes the wet fluid to expand immediately and since the added moisture requires a certain amount of heat to vaporize it, the sensible heat of the slag is utilized quickly as each pellet or bubble is formed. This causes the slag to solidify rapidly and prevents the cells from shrinking once they are formed.

By suitable temperature-control means, I maintain the fluid at a certain temperature during operation, the range being between 100° F and 500° F. (in the case of steam the temperature range may be between 250° F. and 500° F.). An increase in temperature is sometimes necessary when the temperature of the molten slag is on the low side. An increase of fluid temperature in such a case will produce a more porous product by overcoming the cooling effect of the moisture addition. Temperature control is beneficial when slag conditions are not entirely suitable.

In order to produce different sizes and weights, the pressure on the fluid may be varied within a range of from 15 lbs. per sq. inch to 110 lbs. per sq. inch. A certain pressure is necessary to blow the pellets of bubble slag free of the apparatus and into a container or hopper. However, through a combination of pressure on the low side of the range and a high moisture content, a lightweight product can be produced. As the pressure increases and the moisture remains constant a smaller-sized product is formed. In short, with constant moisture content, the size of the product varies inversely with the pressure. Various combinations of pressure and moisture content of the fluid yield various sizes and weights of product.

For best results, the temperature of the slag, as stated, should be from 2500° to 2900° F.

Figure 4:
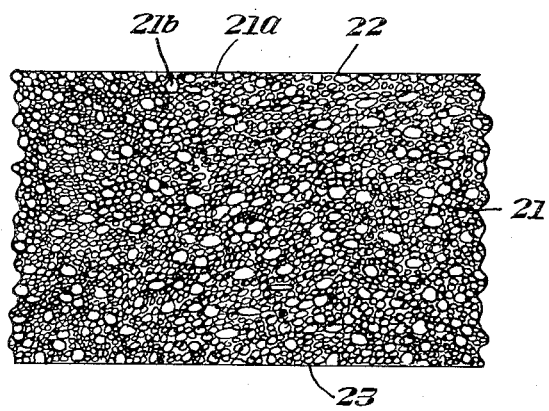
Figure 4 is a sectional view through a slab or block of granulated slag.

The product may also take the form of slabs, blocks or columns consisting of a body 21 (see Fig. 4) of innumerable small cells 21a with larger voids 21b scattered therethrough, all enclosed within vitreous outer walls 22 and 23. This structure is produced in an apparatus such as illustrated in Figure 5 in which an expansion chamber 24 having means of support 25 and 26 is partially filled with molten slag. A fluid (steam, air or the like) of controlled temperature, pressure and moisture content is then introduced through line 27 by means of valve 28 until the slag charge is subject to known pressure. After the slag has cooled to a temperature just above its melting point, this pressure is suddenly released by opening gate 29 which causes the slag to froth and expand with the sudden expansion of gas in solution and at the same time to cool and solidify. Pusher means 30 is provided for removing this solidified block or slab whereby the process is expedited.

Although a process has been described whereby my product may be formed it is to be understood that it is not desired to limit the invention thereto except as defined in the following claims.

I claim:

1. In the process of forming a dry, granulated slag product in the form of individual cells or pellets of controlled size and weight, the steps of introducing a fluid having a temperature between 212° F and 500° F. and a moisture content of 0.5% to 15% under a pressure of 15 to 110 lbs./in.² into the open enlarged portion of a Venturi-like member having an open enlarged portion terminating in a restricted orifice, said enlarged portion being partially submerged in a pool of molten slag and blowing the molten slag from the enlarged portion of the venturi through the restricted orifice and free of the pool of molten slag.

2. In the process of forming a dry, granulated slag product in the form of individual cells or pellets, the steps of introducing a fluid having a temperature between 100° F. to 500° F. and a moisture content of 0.5% to 15% under a pressure of 15 to 110 lbs./in.² into the open enlarged portion of a Venturi-like member having an open enlarged portion terminating in a restricted orifice said enlarged portion being partially submerged in a pool of molten slag and blowing the molten slag from the enlarged portion of the venturi through the restricted orifice and free of the pool of molten slag.

3. In the process of forming a dry, granulated slag product in the form of individual cells or pellets of controlled size and weight the steps of introducing a fluid having a temperature between 212° F. and 500° F. and a moisture content of 0.5% to 15% under a pressure of 15 to 110 lbs./in.² in the form of a jet centrally into the open enlarged end of a Venturi-like member having an open enlarged end terminating in a restricted orifice said end being partially submerged in a pool of molten slag, adjusting the position of the entrance of the jet into the enlarged end of the Venturi-like member to a position relative to the restricted orifice and blowing the molten slag from the expanded end of the Venturi member through the restricted orifice and free of the pool of molten slag.

4. In the process of forming a dry, granulated slag product in the form of individual cells or pellets, of controlled size and weight the steps of introducing a fluid having a temperature between 212° F. and 500° F. and a moisture content of 0.5% to 15% under a pressure of 15 to 110 lbs./in.² into the open enlarged portion of a Venturi-like member having an open enlarged portion terminating in a restricted orifice said enlarged portion being partially submerged in a pool of molten slag and blowing the molten slag from the expanded portion of the venturi through the restricted orifice and free of the pool of molten slag and curing the pellets in an atmosphere of wet steam.

5. In the process of forming a dry, granulated slag product in the form of individual cells or pellets of controlled size and weight, the steps of introducing steam having a temperature between 212° F. and 500° F. and a moisture content of 0.5% to 15% under a pressure of 15 to 110 lbs./in.² into one end of a Venturi-like member having a pair of open end frusto-conical portions connected together at their apical ends to form a restricted interconnecting portion, said one end being partially submerged in a pool of molten slag and blowing the molten slag from the one end through the restricted orifice and free of the pool of molten slag.

6. A dry, granulated slag product of controlled size and weight in the form of individual pellets or bubbles comprising a substantially spherical shell of innumerable small cells surrounding a central void and having a substantially vitreous outer surface.

7. A dry, granulated slag product of controlled size and weight in the form of individual pellets or bubbles comprising a substantially spherical shell of innumerable small cells surrounding a central void, a substantially vitreous outer surface on said pellets and a substantially vitreous internal surface bounding each cell and the central void.

CHARLES W. SCHOTT.

REFERENCES CITED

The following references are of record in the file of this patent:

UNITED STATES PATENTS

| Number | Name | Date |
| --- | --- | --- |
| 1,699,575 | Spies | Jan. 23, 1929 |
| 1,950,932 | Schott | Mar. 13, 1934 |
| 2,023,511 | Brosius | Dec. 10, 1935 |
| 2,059,230 | Hall et al. | Nov. 3, 1936 |
| 2,215,223 | Lytle | Sept. 17, 1940 |
| 2,255,236 | Willis | Sept. 9, 1941 |
| 2,255,237 | Willis | Sept. 9, 1941 |
| 2,255,238 | Willis | Sept. 9, 1941 |
| 2,417,301 | Hayes | Mar. 11, 1947 |

FOREIGN PATENTS

| Number | Country | Date |
| --- | --- | --- |
| 143,500 | Great Britain | Apr. 7, 1921 |